United States Patent [19]

Bravo

[11] Patent Number: 5,135,324
[45] Date of Patent: Aug. 4, 1992

[54] METHOD OF AND STRUCTURE FOR REMOVING A FLEXIBLE PIPELINE

[76] Inventor: Sergio M. Bravo, 2872 Tigertail Dr., Los Alamitos, Calif. 90720

[21] Appl. No.: 654,952

[22] Filed: Feb. 13, 1991

[51] Int. Cl.$^5$ ............................................. F16L 1/028
[52] U.S. Cl. .................................. 405/52; 137/236.1; 405/303
[58] Field of Search ............... 405/52, 53, 270, 303; 137/236.1

[56] References Cited

U.S. PATENT DOCUMENTS

| | | | |
|---|---|---|---|
| 1,890,618 | 12/1932 | Le Duc . | |
| 2,621,902 | 12/1952 | Lindquist | 257/224 |
| 2,860,008 | 11/1958 | Jacoby | 299/47 |
| 3,182,682 | 5/1965 | Gilliam | 137/515.5 |
| 3,675,952 | 7/1972 | Mears | 285/302 |
| 4,132,083 | 1/1979 | McGrath | 405/184 |
| 4,449,853 | 5/1984 | Mennella et al. | 405/184 |
| 4,639,164 | 1/1987 | Pugnale et al. | 405/54 |
| 4,643,523 | 2/1987 | Smedley et al. | 350/319 |
| 4,770,562 | 9/1988 | Muller et al. | 405/154 |
| 4,805,444 | 2/1989 | Webb | 73/40.5 R |
| 4,818,151 | 4/1989 | Moreland | 405/303 |
| 4,842,163 | 6/1989 | Bravo | 222/40 |
| 4,932,257 | 6/1980 | Webb | 73/40.5 R |
| 4,971,225 | 11/1990 | Bravo | 222/110 |
| 4,971,477 | 11/1990 | Webb et al. | 405/154 |

OTHER PUBLICATIONS

Titeflex(RM) Catalog by Titeflex Industrial Americas, Springfield, MA, Jun. 1990.
Island Containment Systems instruction sheet by S. Bravo Systems, Inc., Los Angeles CA, 1989.

Primary Examiner—David H. Corbin
Attorney, Agent, or Firm—Christie, Parker & Hale

[57] ABSTRACT

A secondary containment in which gasoline passes from a storage tank through an underground pipeline past an impact valve to an inlet of a gasoline dispenser includes inner and outer pipelines. The inner pipeline includes a rigid segment connected to the storage tank at one end and a flexible pipe segment at its other end. The flexible segment further connects to an additional pipe segment which passes through the bottom of a gasoline containment box to an impact valve housed therein. The impact valve, in turn, leads to the dispenser inlet. The box is installed below the dispenser, and the flexible segment connects to the additional pipe segment at a point below the box. The flexible segment is removed from the outer pipeline by disconnecting it from the rigid pipe segment, then disconnecting the impact valve from the dispenser inlet and box, and removing the impact valve from the box. The additional pipe segment and the flexible pipe segment are thus pulled through the bottom of the containment box.

10 Claims, 6 Drawing Sheets

METHOD OF AND STRUCTURE FOR REMOVING A FLEXIBLE PIPELINE

BACKGROUND OF THE INVENTION

The present invention relates to a removable flexible pipeline in a secondary containment system. More particularly, the invention relates to a method of and a structure for removing a flexible inner pipeline from within an outer pipeline.

In recent years, increased awareness of air and water pollution problems caused by leaking gasoline or other polluting elements has focused attention on ways to detect and prevent such leaking. To this end, double walled piping systems have been developed. For example, in U.S. Pat. No. 4,932,257 (to Webb), a primary pipeline carries gasoline from an underground storage tank to a dispenser, and a secondary pipeline surrounds the primary pipeline to prevent leaking gasoline from contaminating the ground.

In U.S. Pat. Nos. 4,842,163 and 4,971,225 (both to Bravo), a containment box is installed directly below a gasoline dispenser and around a gasoline pump to collect leaks from the dispenser or pump.

In such secondary containment systems, however, it is difficult to effect repairs on the primary pipeline should a leak develop. Often one must not only break ground around the gasoline pump, but also break up the island on which the pump is located to determine where the leak is and to fix it. U.S. Pat. No. 4,971,477 (to Webb et al.) discloses one approach to this problem. In this patent, there is a secondary containment system with a double pipeline formed in segments. Each segment connects two access chambers which extend from ground level to below the pipeline. The ends of an outer pipeline segment connect to fittings built into adjacent chambers, respectively. The ends of an inner pipeline connect to fittings at a position located within adjacent chambers, respectively. The inner pipeline is flexible. When an inner pipeline segment or fitting is in need of repair, the covers of two adjacent chambers are removed and the fittings for the inner pipeline segment are disconnected. Then, that segment is removed from one of the access chambers for repair or replacement.

In the Webb, et al. system, there must be at least two access chambers to remove a flexible inner pipe. Moreover, although Webb, et al. show an access chamber below a gasoline dispenser, the patent does not disclose a way to remove the segment leading to the gasoline dispenser if a leak develops in that segment. One would have to remove the dispenser and perhaps even break up the island on which the dispenser is located. Moreover, Webb et al do not address the situation where a containment box, such as in the Bravo patents, is used, and the flexible pipeline connects to a rigid line at a point below the containment box.

SUMMARY OF THE INVENTION

The invention is a method of and structure for removing a flexible pipeline from within a secondary pipeline. In one embodiment, a double pipeline extends from an underground tank through one pit to a gasoline dispenser.

The double pipeline has an inner pipeline and an outer pipeline. The portion of the outer pipeline passing through the pit is formed by a removable sleeve. Inside the sleeve, there is a fitting for the inner pipeline which connects a rigid pipe from the tank with one end of a flexible pipe. The flexible pipe extends through two 45° elbows or other 90° coupling to just below the bottom of a containment box. The box is directly below the dispenser and encloses an impact valve to contain any leaks from the valve or dispenser. A rigid connector pipe at the bottom of the impact valve connects to the second end of the flexible pipe. To remove the flexible pipeline, a repair worker enters the pit and slides the sleeve to reveal the first end of the flexible pipeline and its coupling to the rigid inner pipeline. The worker uncouples the pipelines and plugs the rigid pipeline. Then, by means of an opening in the dispenser, the worker uncouples the impact valve from the dispenser inlet and from the containment box. Without uncoupling the valve, rigid connector pipe, and flexible pipe, the worker pulls the valve along with the connector pipe and flexible pipe through the opening in the dispenser.

DETAILED DESCRIPTION OF THE PREFERRED EMBODIMENT

The invention is a secondary containment system in which a flexible primary pipeline is removable for repair or replacement, without moving the dispenser and without breaking up a concrete island on which the dispenser rests. The invention is also a method for removing the primary pipeline.

Figure 1:
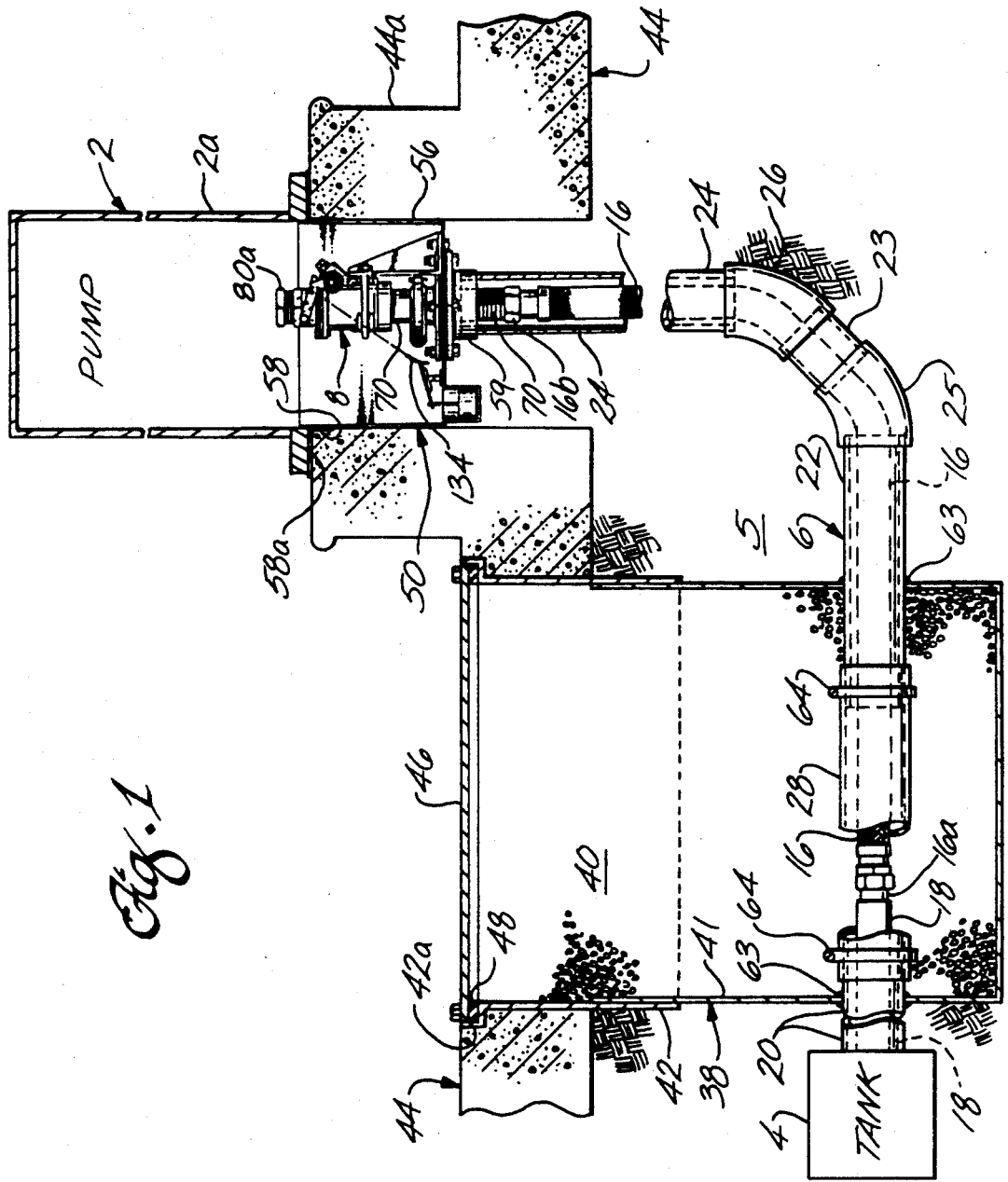
FIG. 1 is a partial cut-away side view to a secondary containment system constructed in accordance with the invention.

With reference to FIG. 1 which is a partial cut-away side view of a secondary containment system constructed in accordance with the invention, a gasoline dispenser or pump 2 connects to a gasoline storage tank 4 located in ground 5 via a pipe system and an impact valve assembly generally indicated by reference numerals 6 and 8, respectively. Pipe system 6 includes a primary or inner pipeline of a flexible pipe 16 and a rigid supply pipe 18, along with a secondary or outer pipeline for secondary containment. The outer pipeline is formed by straight pipes 20, 22, 23, 24, two 45. angles 25, 26, and a flexible coupling sleeve 28, e.g., accordion style. As is well-known in the art, all of the elements of the secondary pipeline should be noncorrosive in soil as well as gasoline, and all of the elements of the inner pipeline need only be noncorrosive with gasoline. Suitable materials for the outer pipeline include FIBERGLASS, a registered trademark of Owens Corning, and suitable materials for the inner pipeline include stainless steel. Typical sizes for the pipe system include two-inch diameter for the inner pipeline and three-inch diameter for the outer pipeline.

The secondary containment system has a single pit 34 through which pipe system 6 passes. The pit is formed by a rectangular box 38 or container, preferably filled with peat gravel 40 to absorb any fumes. Container 38 has a lower fixed portion 41 and a telescoping upper portion 42, with a lip 42a that rests on the service station's pavement 44 to fix its position. Container 38 has a cover 46 with a sealing material 48 between it and lip 42a. The cover and the sealing material are bolted to the lip.

The secondary containment system also has a leakage containment box 50, such as disclosed in U.S. Pat. Nos. 4,842,163 and 4,971,225 (to Bravo), incorporated by reference herein. Box 50 is installed in a concrete island 44a contiguously formed with pavement 44. Box 50 has a lower portion 56 and an upper portion 58 welded together Upper portion 58 has a lip 58a that rests on the concrete island to fix its position. Straight pipe 24 connects to box 50 by threading inside of a cylindrical coupling 59. A square flange 60 welded to coupling 59 attaches to the bottom of box 50 with a square gasket 61 in between.

Container 38 has aligned apertures through which pipes 20 and 22 enter. The pipes are sealed to the apertures by resilient grommets 63. Flexible sleeve 28 couples pipes 20, 22 inside container 38. The sleeve 28 is fastened to the pipes by clamps 64 so that the sleeve can be unclamped and slid open (to the right in FIG. 1) to reveal one end of flexible pipe 16 and its coupling to supply pipe 18.

Figure 3:
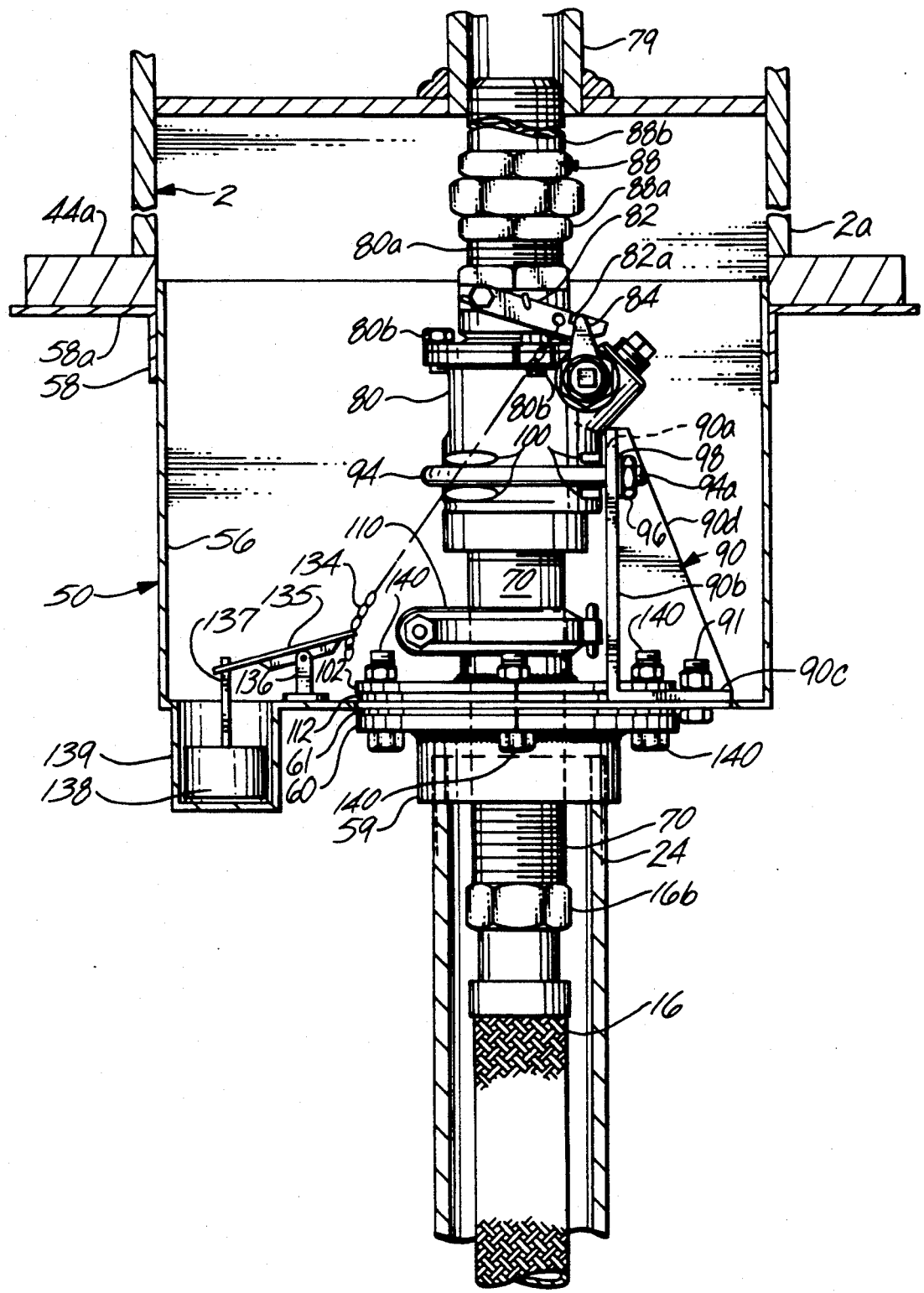
FIG. 3 is a side view of an impact valve assembly and its connection to a gasoline dispenser and a flexible inner pipeline in the system of FIG. 1, in accordance with the invention.

An externally threaded swivel member 16a couples pipe 16 to internally threaded pipe 18. Swivel member 16a is preferably part of pipe 16. The other end of flexible pipe 16 has an internally threaded fixed nut 16b which connects to an externally threaded pipe 70, as best seen in the enlarged view of FIG. 3 showing the impact valve assembly and its connection to the flexible pipe and dispenser inlet. One suitable flexible pipe is known as TITEFLEX FIRE SAFE ™ (manufactured by Titeflex Industrial Americas of Springfield, Massachusetts), which is a steel braided flexible connector with an internally threaded nut at one end and an externally threaded rotatable pipe at the other end.

With continued reference to FIG. 3, impact valve assembly 8, including pipe 70, mounts to the bottom of box 50, with part of pipe 70 extending through a hole 50a in the bottom of box 50 to connect to flexible pipe 16. Part of assembly 8 also extends toward or above the top of box 50 for connection to an inlet 79 of pump 2 by means of a fitting 88 (not shown in FIG. 1 for the sake of clarity).

The impact valve has a housing 80 threadedly supported on pipe 70. Impact valves in general are well-known in the art, but briefly, include a lever 82 freely rotatably supported by a screw attached to housing 80, an arm 82 having a recess 82a for engaging a pin of a rotatably biased arm 84, to prevent rotation of the arm. Arm 84 controls a flap (not shown) inside the housing, such that when the arm is substantially vertical with the pin in recess 82a of lever 82, the flap is open and thus the valve is open. Whenever lever 82 moves downward, such as when pump 2 has been impacted by a car or the like, arm 84 rotates clockwise when its pin comes free of recess 82a, and this moves the flap to close the valve such that gasoline flow to the pump is cut off.

To connect impact valve assembly 8 to flexible pipe 16, pipe 70 has an externally threaded lower end that fits into nut 16b of pipe 16. To connect valve assembly 8 to inlet 79, the upper end of the valve housing has an externally threaded integrally formed pipe 80a that threads in a nut 88a of one end of fitting 88. Internally threaded inlet 79 receives an externally threaded end 88b at the other end of fitting 88.

In accordance with one aspect of the invention, the impact valve assembly 8 is supported in containment box 50 such that assembly 8 is vertically adjustable within box 50 for ease of attachment to pump inlet 79. The construction that achieves this telescoping action is as follows:

Assembly 8 is supported by a bracket 90, which is formed by a vertical plate 90b with two horizontal legs 90c, and a gusset 90d connected to the vertical plate and one of the legs. Bracket 90 fastens to the bottom of box by means of two bolts 91, one through each leg. Bracket 90 has two vertical elongate slots 90a through which threaded ends 94a of a U-bolt 94 extend. Two nuts 96 with washers 98 fasten the U-bolt to bracket 90. U-bolt 94 fits in a groove formed by projections 100 on housing 80.

Figure 4:
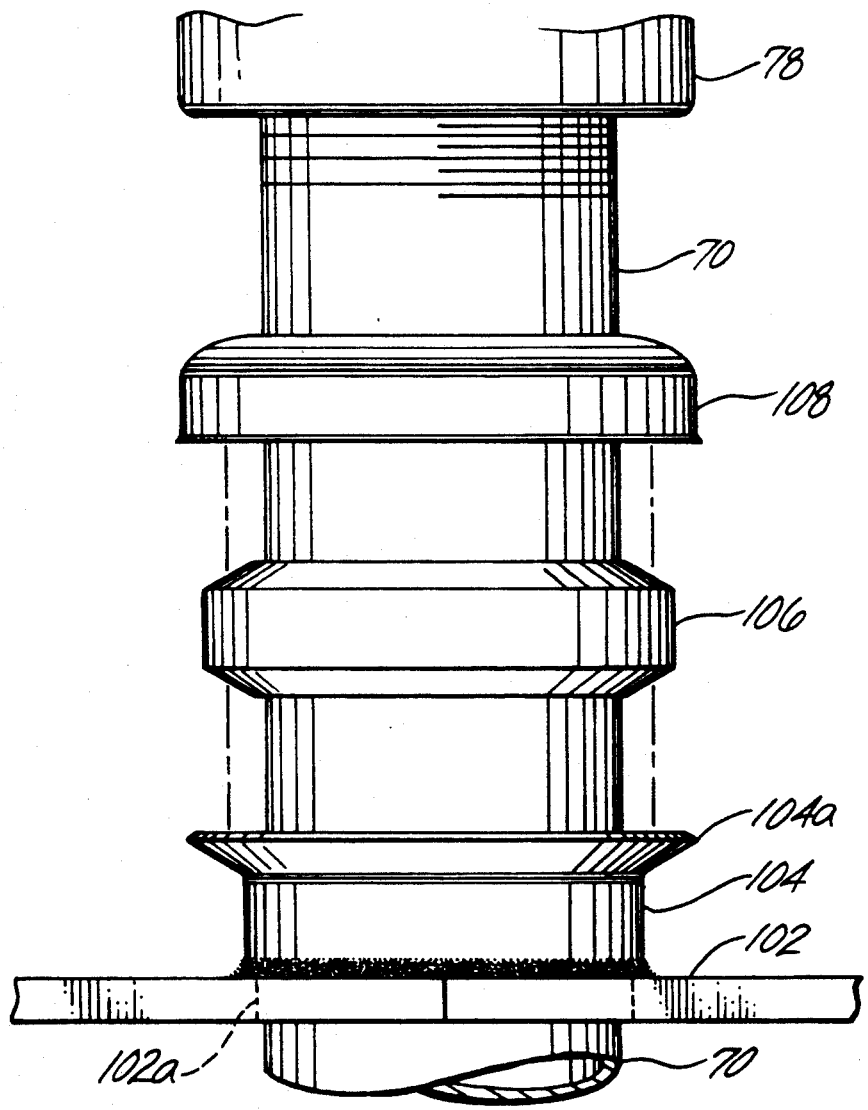
FIG. 4 is an enlarged partially exploded view of a portion of FIG. 3 showing a mechanism for sealing a pipe from the impact valve assembly to the bottom of a containment box.
Figure 5:
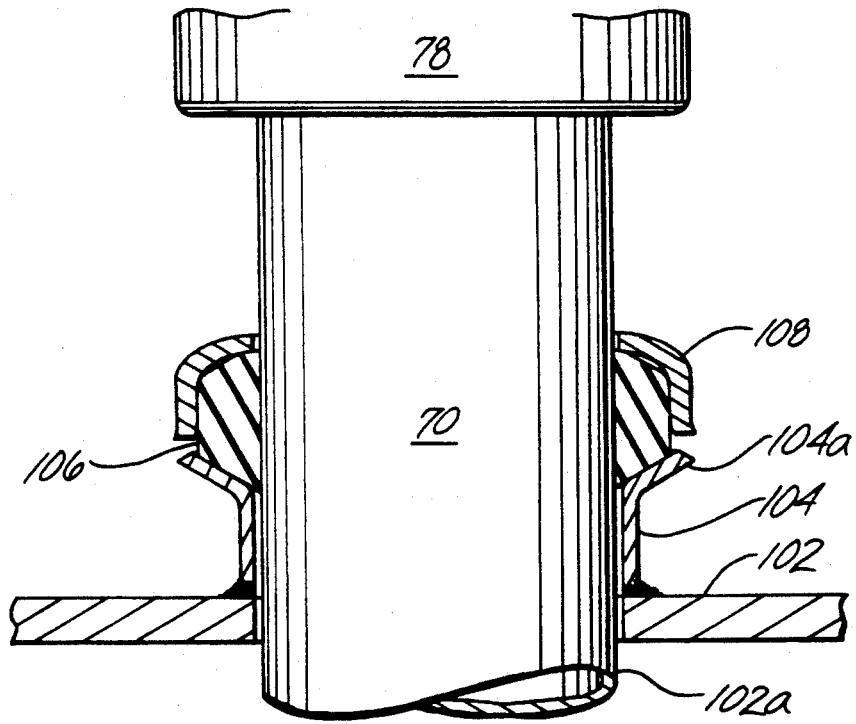
FIG. 5 is a vertical sectional view of the elements of FIG. 4, but in their unexploded form.

To provide a fluid-tight seal between hole 50a in the box bottom and pipe 70, as well as to assist in supporting pipe 70 and thus assembly 8, a square plate 102 having a central aperture 102a has a cylindrical rod segment 104, with a cup-like flange 104a, welded on it. The aperture and segment 104 are aligned and are best shown in the partial, enlarged view of FIG. 4, and the sectional view of FIG. 5. A resilient sealing element 106 sits in flange 104a and an annular cover 108 sits on the sealing element, as shown in exploded form in FIG. 4, and in seated form in FIG. 5. Referring to FIG. 3, clamp 110 fastens cover 108 and flange 104a together, thereby compressing sealing element 106.

Plate 102 sits on a square gasket 112. The gasket 112 has an aperture lined up with that of plate 102. As described in more detail below, during repair or installation of the impact valve, the vertical position of housing 80 is adjusted by unfastening fitting 88 from pipe 80a, loosening nuts 96 and clamp 110, and moving housing 80 as desired, but as limited by the length of the slots 90a.

As discussed in detail in the above-mentioned patents to Bravo, the impact valve is also connected with a system for detecting gasoline leakage. A chain 134 connects lever 82 with another lever 135 which rotates on a mounting arm 136. Lever 135 connects at its other end to a linkage 137 holding a float 138 in a well 139 formed in the bottom of box 50. As gasoline accumulates in well 39, float 138 rises which causes a downward pulling on a chain 134. When sufficient gasoline collects in well 139, the chain will pull lever 82 such that the pin of arm 84 releases from recess 82a, thus closing the valve.

OPERATION OF THE INVENTION

Figure 6:
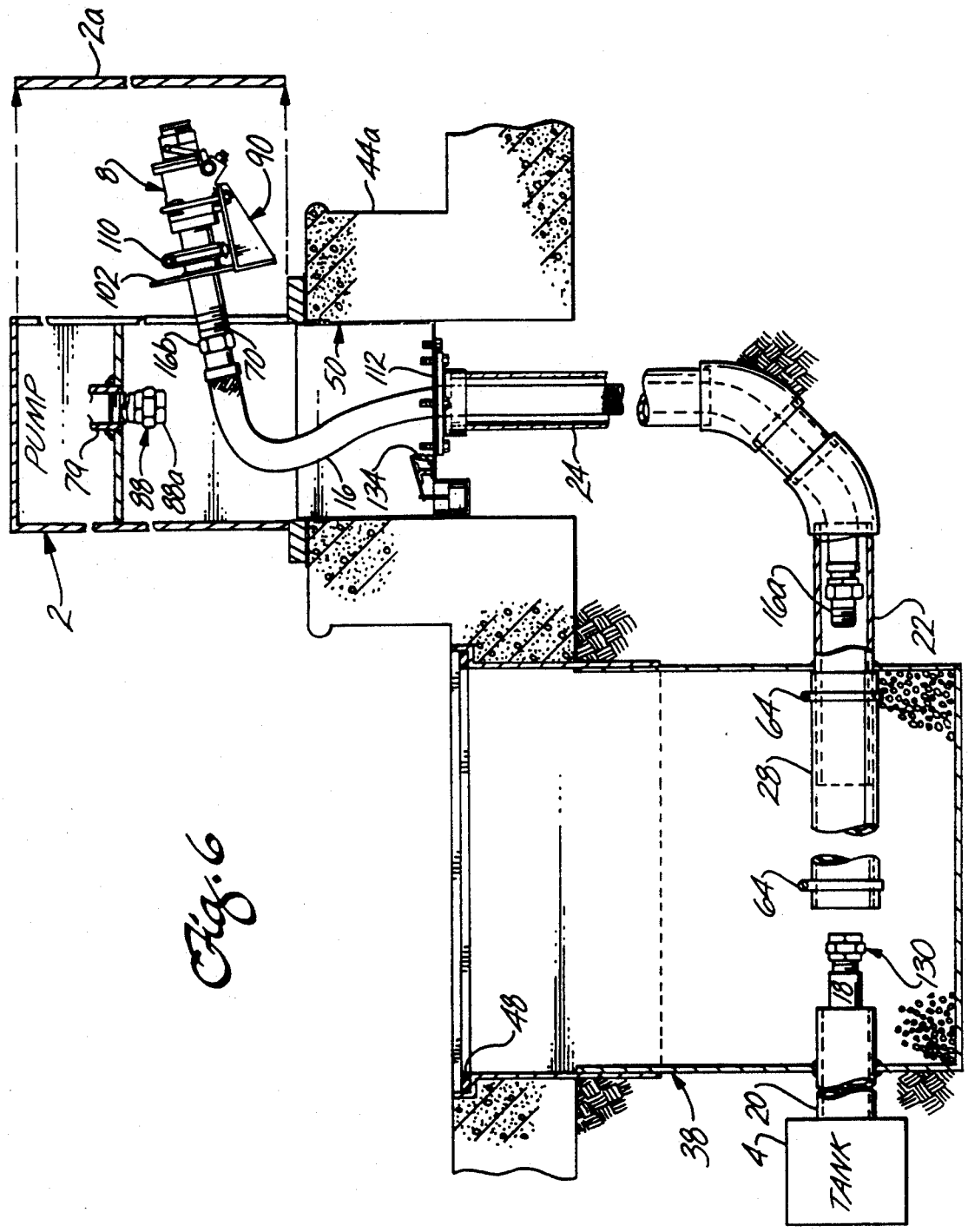
FIG. 6 is a view similar to FIG. 1 but showing the impact valve assembly and flexible inner pipeline being removed via the gasoline dispenser.

A major aspect of the present invention, as discussed above, is to remove the primary pipeline for repair or replacement without disturbing the secondary containment system and without breaking up pavement or moving the containment box or pump. When a leak is suspected, the primary pipeline will have to be inspected and replaced, if necessary. Other circumstances may give rise to inspection and possible replacement of the line. With reference to FIG. 6, which is a view similar to FIG. 1, but showing the flexible pipe 16 being removed, removal is accomplished as follows:

1. Shut off pump 2.
2. Remove cover 46 and excavate any gravel in pit 34.
3. Loosen clamps 64 and slide sleeve 28 away from the coupling of flex pipe 16 with supply pipe 18.
4. Detach the swivel end 16a from pipe 18 and cap pipe 18 with a threaded plug 130.

It is now time to remove the flexible pipe with the impact valve assembly 8. To do so, continue as follows:

5. Open side 2a of pump 2 by removing a panel as is well known in the art.
6. Unfasten nuts (four) from bolts 140 (FIG. 3) and nuts (two) from bolts 91 to release mounting bracket 90 and square plate 102. It should be noted that in accordance with the invention, the nuts on these bolts face upward to allow their removal without the need for access to underneath box 50. Also disconnect chain 134.
7. To release the top of the impact valve assembly, remove nut 88a from pipe 80a, e.g., by threading fitting 88 further into inlet 79. Alternatively, fitting 88 can be further threaded onto pipe 80a and out of inlet 79. If neither of these options work, one can unfasten the U-clamp 94 and remove it, and loosen clamp 110. Then, the entire impact valve assembly rotates as necessary to free it from fitting 88. Another alternative is to disconnect bolts 80b to remove the top of the impact valve housing from the rest of the impact valve assembly.
8. Once the impact valve assembly is free from connection with inlet 79 and box 50, the entire assembly, square bracket 102, U-clamp 94, and mounting bracket 90 is pulled out of the containment box 50 and pump 2, which thus pulls along flex pipe 16. Therefore, there is no need to uncouple flex pipe 16 from pipe 70.

If there is insufficient clearance to remove the entire assembly 8 along with the square bracket 102, U-clamp 94, and mounting bracket 90, there are numerous ways to accomplish removal of pipe 16. For example, U-clamp 94 can be unfastened, and bracket 90 can be left attached to box 50. As noted above, even the top of housing BO can be removed by unfastening bolts 80b. In addition, the entire housing 80 can be unthreaded from pipe 70. If the entire housing is removed from pipe 70, plate 102 with cylinder 104a and sealing element 106, cover 108, and clamp 110 can be removed separately by releasing clamp 110. In addition, if aperture 102a in plate 102 is sufficiently large, the flexible pipe 16 can be removed without removing plate 102 by pulling pipe 16 through the hole.

Once pipe 16 has been removed, it can be inspected and detached from pipe 70. If necessary, a new flexible pipe (16) is attached to pipe 70 at the nut end (16b) and the swivel end (16a) of pipe (16) is snaked through the hole in box 50 down to supply pipe 18. Plug 130 is removed and the swivel end (16a) is attached to pipe 18. The sleeve 28 is slid back over the coupling of the inner pipeline, and each clamp 64 is fastened to bridge pipes 20 and 22. Next, the impact valve assembly is reassembled as necessary and reattached to inlet 79 essentially in the opposite order in which it was disassembled and removed.

In reconnecting assembly 8 to inlet 79, because assembly 8 telescopes, there is sufficient slack to overcome vertical tolerance problems. For horizontal tolerance, generally there is only about 1/16" of tolerance in reconnecting the impact valve with the pump inlet 79. However, the telescoping feature of the impact valve greatly enlarges the vertical tolerance generally by the length of the slots 90a in bracket 90, and the plate 102 can be adjusted about 1/16" horizontally.

If the entire impact valve assembly has been removed along with bracket 90 and plate 102, then there should be room to simply align the holes in the plate and the bracket with the bolts 140 and 91. Once this has been done, the nuts can be replaced and the fitting 88 attached to the top of assembly 8 or the bottom of inlet 79, depending on which it has been removed from. If there is insufficient clearance, the U-bolt 94 and clamp 110 should be unfastened to allow pipe 70 to telescope down through the hole in box 50 as far as necessary. Then, upon attachment of fitting 88, the U-bolt and clamp 110 are refastened.

Once fitting 88 is attached, fasten the U-clamp 94 and clamp 110. Finally, reattach chain 134 to lever 82.

Using the above structure and method, the station need not be shut down during repair of flexible pipe 16 because the island or other areas of pavement need not be torn up.

Figure 2:
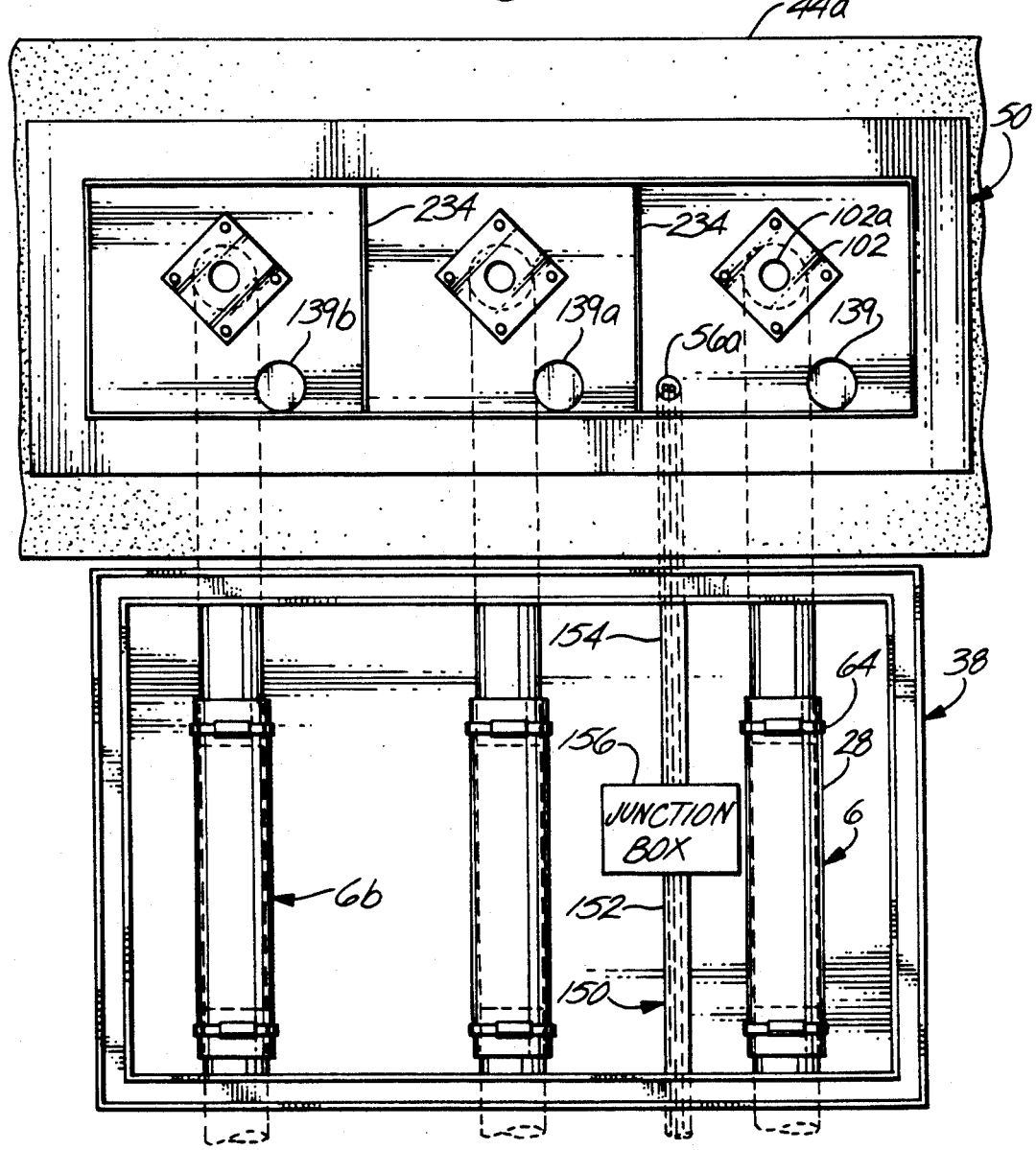
FIG. 2 is a partial top view of the system of FIG. 1 showing a layout of gasoline pipelines in the secondary containment system according to the invention.

With reference to FIG. 2, a further aspect of the invention will be described. Pump 2 in most service stations will be adjacent to other pumps, to serve leaded, unleaded, and super-unleaded gasoline, for example. Accordingly, in FIG. 2, three pipe systems 6, 6a, 6b are shown passing through container 38 and leading to three separate holes in containment box 50. Box 50 has two partitions 234 to separate the three pumps. There are also three wells 139, 139a, 139b. One suitable box is a model 315 by S. Bravo Systems, Inc. of Los Angeles, California. Other details of this system including the impact valve assembly and the like are the same as described above. These details have been left out of FIG. 2 for the sake of clarity.

In accordance with a further aspect of the invention, an electrical line 150 between the storage tank and pump 2 consists of two lines 152 and 154 joined at a junction box 156 in container 38. The electrical line 154 leads from the junction box to a hole 56a in containment box 50 and to pump 2 as is well-known in the art. The advantage of using junction box 156 with two lines 152, 154 is that in the case of an accident, such as a car colliding with pump 2, generally the electrical line will burn. To prevent it from burning all the way back to the storage tank, junction box 156 is provided. Accordingly, replacement of line 154 is much simpler than replacement of the entire line 150.

It should be noted that installation of container 38 may be complicated if pavement 44 is not level. If this is the case, a tool for leveling container 38 may be used. Such a tool, for example, could be formed by an elongate threaded rod at the center of one end of the container and having its lower end threaded into a nut. This nut would be welded to an angle, the angle being further attached to the bottom of the container. The elongate rod can be reinforced by a generally upside down U-shaped element attached to ends of the angle and having a central aperture with a threaded nut for receiving the rod. At the upper end of the rod, an elongate flat bar can run along the end of the container and attach to the lips at opposite sides of the container, above the angle attached to the bottom of the container. The bar has a nut welded to it, and the rod is threaded into, the nut. The rod also has a nut affixed to it, and by turning this nut the upper portion of the container 38 at one end can be lifted in relation to the lower portion. Another tool having the same construction can be placed at the other end of the container to adjust level at that end.

Numerous variations of the above-disclosed embodiment will come within the scope of the invention. For example, another flammable or hazardous fluid may replace the gasoline. In addition, the flexible pipe 16 need not have an integrally formed swivel end. Both ends may be formed by nuts, or both may be swivel ends, and appropriate fittings would be used. Thus, the above description of the invention is only illustrative, and is not intended to limit the scope of the invention. Rather, the invention is defined in the claims which follow.

I claim:

1. In a secondary containment system in which a flammable fluid passes from a storage tank through an underground primary pipeline past an impact valve to an inlet of a flammable fluid dispenser, the primary pipeline is within a secondary pipeline, and means for supporting the impact valve within a flammable fluid containment box installed underneath the flammable fluid dispenser, the improvement wherein:

the primary pipeline comprises a first pipe segment which is flexible, a second pipe segment connected at one end to the storage tank and at a second end to a first end of the first pipe segment, and means connected to a second end of the first pipe segment below the box and extending up through an aperture in the box for attachment to the impact valve, wherein the first pipe segment is disposed so as to bend 90° from in line with the second pipe segment toward the flammable fluid dispenser; and the means for supporting the impact valve includes means for attaching to the box, the means for attaching being detachable from within the box such that, in response to detachment of the means for supporting the impact valve from the box, disconnection of the first end of the first pipe segment from the second end of the second pipe segment, and removal of the impact valve and the first pie segment pass through the aperture in the box.

2. The secondary containment system of claim 1, further comprising a container disposed in the ground for receiving the primary and secondary pipelines, with the connection between the first and second segments being disposed in the container, and wherein the container communicates with a surface of the ground.

3. The secondary containment system of claim 1, wherein the secondary pipeline comprises means for removable covering the connection between the first and second segments to provide access to the connection.

4. The secondary containment system of claim 1, wherein the impact valve comprises a housing, the means for attachment comprises a third pipe segment, the means for supporting the impact valve comprises an L-shaped bracket, a U-shaped clamp, a plate having a hollow cylindrical segment integrally attached to the plate at one end and having a lip at another end, the third pipe segment passing through the plate and cylindrical segment, and means for sealing a gap between the third pipe segment and the cylindrical segment, and wherein ends of the U-shaped clamp are disposed in elongate holes in a vertical portion of the bracket, and the plate and a horizontal portion of the bracket are bolted to the box from below the box with nuts disposed in the box.

5. The secondary containment system of claim 1, wherein the secondary pipeline comprises two 45° elbows with a segment of straight pipe therebetween disposed where the first pipe segment is bent 90°.

6. A method of removing a first pipe segment of an underground pipeline between a storage tank and a dispenser for flammable fluids, the underground pipeline comprising a primary pipeline including the first pipe segment which is flexible and which has a 90° bend, a secondpipe segment connected at one end to the storage tank and at a second end to a first end of the first pipe segment, and means for connecting a second end of the first pipe segment with an impact valve connected to the dispenser, the impact valve being housed in and attached to a flammable fluid containment box installed underneath the dispenser and the means for connecting extending below the box for connecting with the second end of the first pipe segment, and the underground pipeline further comprises a secondary pipeline for housing the primary pipeline, the method comprising the steps of:

disconnecting the first end of the first pipe segment from the second end of the second pipe segment;

detaching the impact valve from the box and dispenser from within the box; and removing the impact valve from the box so as to pull the means for connecting through the box without disconnecting the second end of the first pipe segment, so as to pull the first pipe segment through the 90° bend and up through the box and remove it from underground.

7. The method of claim 6, wherein the secondary pipeline comprises removable means for covering the connection between the first pipe segment and the second pipe segment, and the method further comprises a step of removing the removable means for covering prior to disconnecting the first end of the first pipe segment from the second end of the second pipe segment.

8. The method of claim 7, wherein a portion of the primary and secondary pipelines passes through a container in communication with a surface of the ground, the portion including the removable means for covering and the connection between the first pipe segment and the second pipe segment, the container being filled with gravel, and the method further comprises a step of excavating the gravel prior to removing the removable means for covering.

9. The method of claim 6, wherein the means for connecting comprises a third pipe segment, the impact valve is attached to the box through a bracket, a plate with a cylindrical segment fixed thereto, and means for sealing the third pipe segment to the cylindrical segment, and the step of removing the impact valve includes removing the bracket, plate, cylindrical segment, and means for sealing.

10. The method of claim 6, wherein the dispenser has an access door, and wherein the impact valve, means for connecting, and first pipe segment are removed through the access door.

* * * * *

UNITED STATES PATENT AND TRADEMARK OFFICE
CERTIFICATE OF CORRECTION

PATENT NO. : 5,135,324

DATED : August 4, 1992

INVENTOR(S) : Sergio M. Bravo

It is certified that error appears in the above-identified patent and that said Letters Patent is hereby corrected as shown below:

```
Column 2, line 60, before "angles" change "45." to -- 45° --.

Column 3, line 20, after "together" add a period and two
          spaces.
Column 3, line 42, after "SAFE" change "TM" to -- ™ --.

Column 4, line 18, after "box" insert -- 50 --.

Column 5, line 41, after "housing" change "BO" to -- 80 --.

Column 6, line 63, after "into" delete the comma
```

UNITED STATES PATENT AND TRADEMARK OFFICE
CERTIFICATE OF CORRECTION

PATENT NO. : 5,135,324

DATED : August 4, 1992

INVENTOR(S) : Sergio M. Bravo

It is certified that error appears in the above-identified patent and that said Letters Patent is hereby corrected as shown below:

Column 7, line 38, after "valve" insert -- from the box, the means for attachment to the impact valve --.

Column 7, line 38, after "first" change "pie" to -- pipe --.

Column 7, line 48, change "removable" to -- removably --.

Column 8, line 12, change "secondpipe" to --second pipe --.

Signed and Sealed this

Fifth Day of October, 1993

BRUCE LEHMAN

*Attest:*

*Attesting Officer*         Commissioner of Patents and Trademarks